United States Patent [19]
Hayashi et al.

[11] Patent Number: 5,398,266
[45] Date of Patent: Mar. 14, 1995

[54] SUPERCONDUCTIVE APPARATUS

[75] Inventors: Katsumi Hayashi; Hiroyuki Handa, both of Hitachi; Tadanori Mizoguchi; Naoyuki Miya, both of Tokai; Masayuki Nagami, Katsuta, all of Japan

[73] Assignees: Hitachi, Ltd.; Hitachi Engineering Co., Ltd.; Japan Atomic Energy Research Institute, Japan

[21] Appl. No.: 60,051

[22] Filed: May 13, 1993

[30] Foreign Application Priority Data

May 14, 1992 [JP] Japan .................................. 4-121749

[51] Int. Cl.⁶ .............................................. G21C 11/00
[52] U.S. Cl. ..................................... 376/288; 376/289; 376/142; 505/848
[58] Field of Search ............... 376/287, 288, 289, 142, 376/146, 150; 174/15.4, 15.5; 29/599; 505/848

[56] References Cited

U.S. PATENT DOCUMENTS

| | | | |
|---|---|---|---|
| 3,664,921 | 5/1972 | Christofilos | 376/126 |
| 4,066,496 | 1/1978 | Brown | 376/142 |
| 4,199,402 | 4/1980 | Ahmed | 376/146 |
| 4,341,924 | 7/1982 | Gleim | 174/15.5 |
| 4,407,062 | 10/1983 | Sutcliffe et al. | 29/599 |

FOREIGN PATENT DOCUMENTS 61-102710 5/1986 Japan .

Primary Examiner—Daniel D. Wasil
Attorney, Agent, or Firm—Fay, Sharpe, Beall, Fagan, Minnich & McKee

[57] ABSTRACT

A superconductive apparatus having therein at least a superconductive member includes a lithium containing member so as to interrupt neutrons directed to the superconductive member.

9 Claims, 3 Drawing Sheets

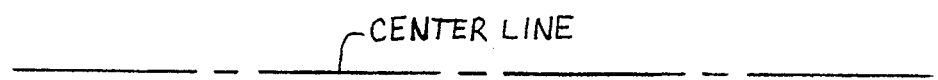
FIG. 1a
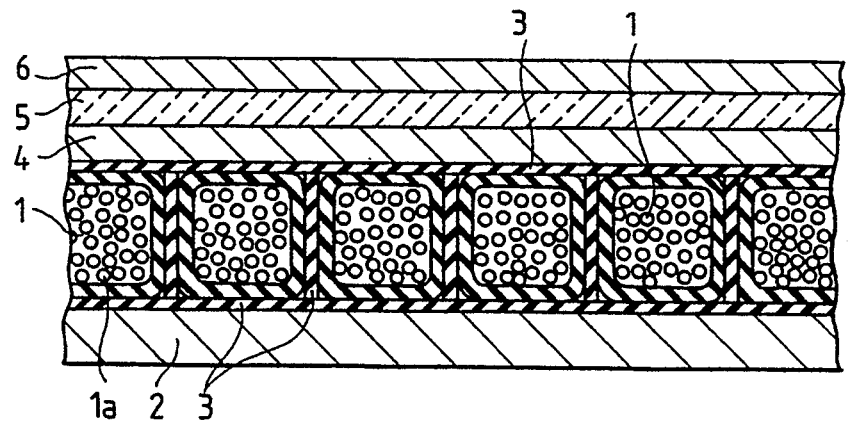
FIG. 1b
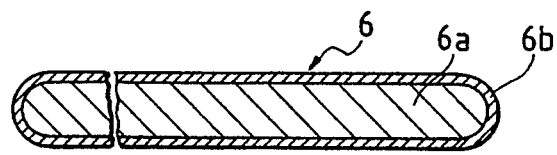
FIG. 2
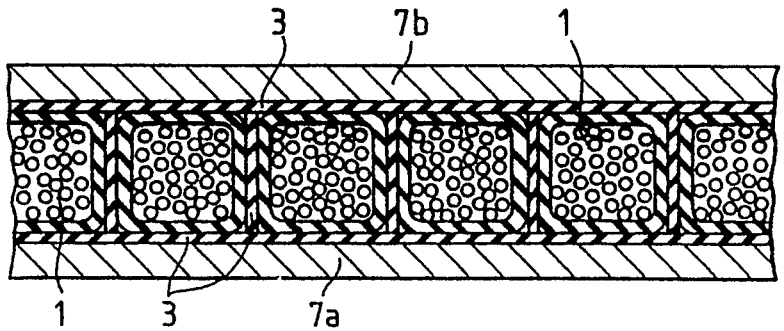

SUPERCONDUCTIVE APPARATUS

BACKGROUND OF THE INVENTION

The present invention relates to a superconductive apparatus such as a superconductive coil, a superconductive motor, a superconductive application element, a superconductive wire, etc. which is used in a neutron existing place as in a high energy particle accelerator, in a nuclear fusion apparatus, in a nuclear reactor, etc. and, more particularly to a superconductive apparatus which is suitable to prevent superconductive material used therein from heat generation and being damaged due to neutron radiation.

A superconductive apparatus concerned with the present invention is used in high energy particle accelerators, in nuclear fusion apparatus, in the nuclear reactors, etc. In such a plant, neutrons are generated, and a lot of neutrons are present in a particular place of the plant.

For example, in a proton accelerator, reactions of atomic nuclei and protons cause an intranuclear cascade, whereby neutrons of high energy are emitted, and neutrons of low energy are emitted from the remaining atomic nuclei in an evaporation process. Therefore, a lot of neutrons are present in a room accommodating the proton accelerator, and in particular, around a beam dump.

In the nuclear fusion apparatus, neutrons having an energy of 14 MeV are generated by reaction of deuterium and tritium in a nuclear fusion plasma. Therefore, a lot of neutrons are present in the nuclear fusion apparatus.

When the superconductive apparatus is used in a place in which a lot of neutrons are present, heat generation by neutron radiation occurs in superconductive material of the superconductive apparatus, so that it is necessary to sufficiently cool the material to keep it below the critical temperature thereof. Therefore, in order to avoid heat generation of the superconductive material by neutron radiation, it is considered to shield neutrons by enclosing the superconductive apparatus with neutron shielding material such as polyethylene. Further, in case of the superconductive coil, for instance, it is disclosed in JP A 61-102710 that the superconductive coil is disposed in a case, and the interior of the case is cooled with liquid helium.

The above-mentioned prior art that encloses the superconductive apparatus with a neutron shielding material such as polyethylene has a problem in that heat generation by secondary gamma rays generated from the neutron shielding material cannot be avoided. Further, the prior art disclosed in the JP A 61-102710 in which the superconductive material is disposed in the casing and the interior of the casing is cooled with liquid helium has a problem in that the cooling apparatus is very large.

SUMMARY OF THE INVENTION

An object of the present invention is to provide a superconductive apparatus which is simple in structure and which can prevent superconductive material thereof from heat generation and from being damaged by neutron radiation.

Another object of the present invention is to provide a superconductive apparatus which is simple in structure and which can prevent superconductive material thereof from heat generation and from being damaged by neutron radiation by providing a lithium member or a lithium containing member, and which can shield heat generated by reaction of neutrons and the lithium.

According to the invention, a superconductive apparatus having therein at least a superconductive member is characterized in that a lithium containing member is provided so as to interrupt neutrons directed to the superconductive member.

According to an aspect of the invention, the superconductive apparatus further includes a heat insulating member disposed therein so as to insulate the superconductive member from the heat generated by neutron radiation in the lithium containing member.

According to another aspect of the invention, the lithium containing member is made of material consisting of Li, and preferably, covered with a thin metal member.

According to another aspect of the invention, the lithium containing member is made of an alloy containing lithium, or a metal having lithium mixed therewith.

In the invention, the lithium containing member is provided so as to interrupt neutrons to the superconductive member. The neutrons are absorbed and reduced in the lithium containing member through (n, $\alpha$)reaction of the lithium containing member and the neutrons, so that most of the neutrons directed to the superconductive member do not reach the superconductive member. The lithium containing member does not generate secondary gamma rays which cause heat generation in the superconductive member when the gamma rays reach the superconductive member. Therefore, the superconductive member is prevented from heat generation by neutron radiation, and damage of the superconductive member by neutron radiation also can be prevented.

The lithium containing member generates heat by neutron radiation thereon. In an aspect of the invention, a heat insulating member is provided between the superconductive member and the lithium containing member, whereby the superconductive member can be insulated from heat generated in the lithium containing member, and is thereby prevented from elevating in temperature by the heat.

BRIEF DESCRIPTION OF THE DRAWINGS

FIG. 1a is a sectional view of a part of a superconductive coil apparatus of an embodiment of the invention;

FIG. 1b is a sectional view of a lithium containing member which can be used in the superconductive coil apparatus;

FIG. 2 is a sectional view of a part of a superconductive coil apparatus of another embodiment of the invention;

DESCRIPTION OF THE EMBODIMENTS

Figure 3:
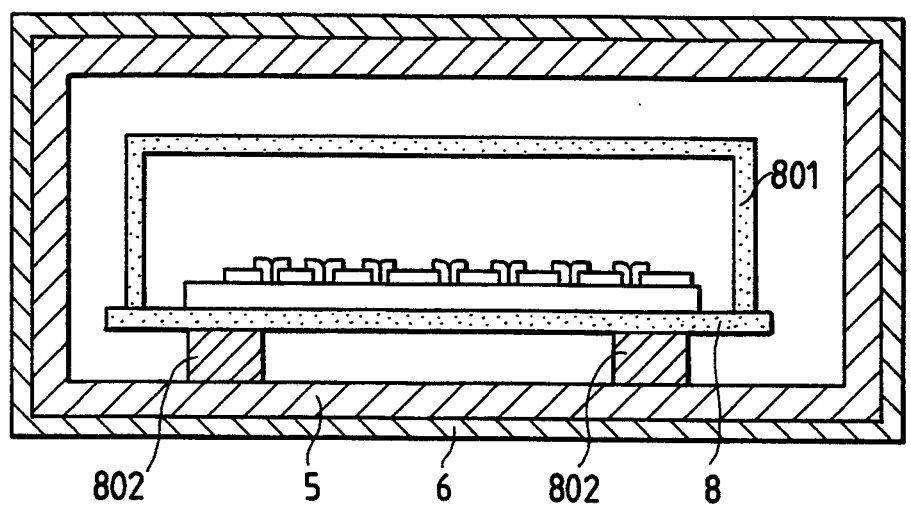
FIG. 3 is a sectional view of a superconductive application element of another embodiment of the invention.

An embodiment of a superconductive apparatus according to the present invention will be described hereunder in detail, referring to the drawing.

In FIG.. 1a, a solenoid type superconductive coil apparatus as a superconductive apparatus is illustrated.

The coil apparatus comprises a plurality of superconductive coils 1 arranged in and supported by a coil bobbin 4, each of which coils 1 includes superconductive members 1a wound and bounded, electric insulating members 3 laminated at both sides of and between the superconductive coil rows, a support 2 supporting the superconductive coils 1 wound on the bobbin 4 so as not to expand, a heat insulating member 5 on a neutron exposure side of the superconductive coils 1 and a layer 6 of lithium containing material on the heat insulating member 5 on the outside of the heat insulating member 5.

When conventional superconductive coil apparatus are used in a place where a lot of neutrons are present, heat generation by neutron radiation occurs to raise the temperature of the superconductive coils, and the superconductive coils are damaged by the neutrons. In this embodiment, however, the layer 6 of lithium containing material is arranged on the neutron exposure side of the superconductive coils 1. Neutrons directed to the superconductive coils 1 effect (n, α) reaction in the layer 6 and the neutrons decrease. Further, secondary gamma rays are not generated from the layer 6 of Li containing material. Therefore, heat generation by neutron radiation of the superconductive coils 1 is surely prevented, the superconductive coils 1 can be kept in a stable superconductive condition, and the coils are thus prevented from being damaged by the neutrons.

When the lithium containing material consists essentially of lithium, the layer 6 is preferably constituted of a lithium plate 6a and a thin casing 6b of a thin metal plate such as a stainless plate, covering the lithium plate, as shown in FIG.. 1b. In this case, the layer 6, of which the lithium plate 6a is 3 mm thick, for instance, can reduce heat generation by neutrons to about 1/10, compared with the heat generation when the layer 6 is not applied thereto. When the lithium plate 6a is 5 mm thick, the heat generation can be reduced to 1/100.

The above-mentioned Li containing material generates heat through the reaction of lithium and neutrons. In this embodiment, the heat insulating material 5 is arranged inside the layer 6 of lithium containing material. As a result, heat generated by neutrons in the lithium containing material is insulated from the superconductive coils 1 by action of the heat insulating material 5, and thus the superconductive coils 1 can be protected from the heat.

The layer 6 can be made of lithium-aluminum alloy or lithium containing stainless steel.

Another embodiment of the present invention is described hereunder referring to FIG. 2.

In FIG. 2, a superconductive coil apparatus includes a plurality of superconductive coils 1 arranged in a bobbin 7a made of lithium containing metal together with an insulating material 3. A frame 7a made of lithium containing metal retains the superconductive coils 1 so that they do not expand. The lithium containing metal for the bobbin 7b and the frame 7a is a lithium-aluminum alloy, for example. The frame 7a has functions of the support 3 and the layer 6 of lithium containing material in the previous embodiment of FIG. 1a.

The insulating members 3 laminated on both sides of the superconductive coils 1 serve as heat insulation similar to the heat insulation 5 in FIG. 1 in addition to their function of electric insulation.

Therefore, in this embodiment as shown in FIG. 2, radiation heat generation and damage of the superconductive coils 1 by neutrons directed to the superconductive coils 1 from both sides thereof can be prevented. The insulating material 3 can electrically insulate the superconductive coils 1 and the frames 7a and protect the superconductive coils 1 from the heat generated in the lithium containing material.

The lithium containing member, contains preferably more than 1.5% of Li in order to form a compact layer of the lithium containing member.

Examples of the lithium-aluminum alloy are as follows:

| Alloy | (by weight %) | | | | | | |
|---|---|---|---|---|---|---|---|
| | Li | Cu | Mg | Zr | Fe | Si | Al |
| Alithalite B (2090) | 1.9 −2.6 | 2.4 −3.0 | <0.25 | 0.08 −0.15 | <0.12 | <0.08 | Balance |
| 8090 | 2.9 | 1.5 | 2.0 | 0.16 | 0.06 | — | Balance |

Note;
Alithalite B (2090) is an alloy developed by Alcoa Co., and 8090 is an alloy developed by Reynolds Co.

Yet another embodiment of the present invention is described hereunder referring to FIG. 3.

In FIG. 3, a superconductive apparatus including a superconductive application element 8 such as a Josephson junction element is illustrated. The whole of the superconductive application element 8 is surrounded by an insulating material 5 and the whole of the insulating material 5 is surrounded by a layer 6 of Li containing material at the outside of the insulating material 5. The superconductive application element 8 is enclosed in a case 801 and supported by the insulating material 5 through supports 802.

In this embodiment illustrated in FIG. 3, even if neutrons are directed to the superconductive application element 8 from the outside thereof in any direction, the superconductive application element 8 can be prevented from heat generation and damage by neutron radiation. Further, the insulating material 5 can insulate the heat Generated by neutrons in the layer 6 of lithium containing material and prevent the element 8 from the heat.

The insulating material 5 may be omitted in some cases. Insulating material having functions of electric insulation and heat insulation as in FIG. 2 can be used in some cases.

Figure 4:
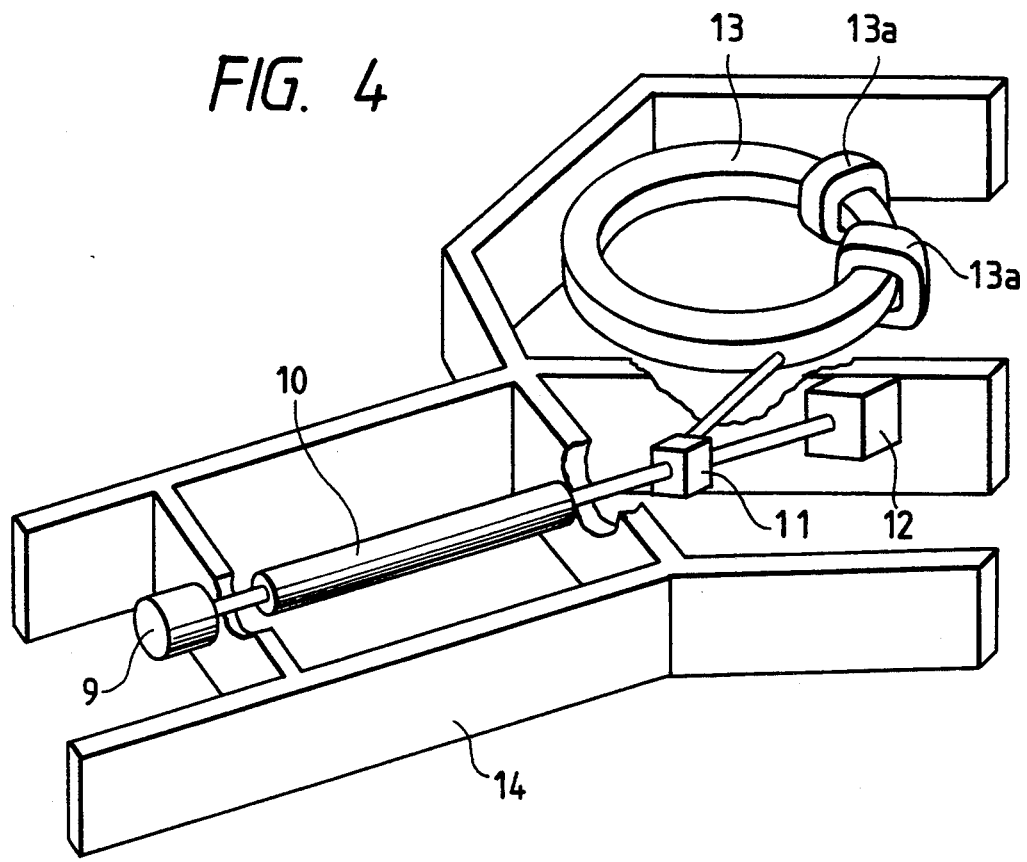
FIG. 4 is a perspective view of a high energy proton accelerator in which an embodiment of the invention is applied.

FIG. 4 illustrates an example of an application of the superconductive coil apparatus as illustrated in FIGS. 2, 3, to a high energy proton accelerator.

In FIG. 4, the high energy proton accelerator comprises an ion source 9, a linear accelerator 10, a beam deflector 11, a beam dump 12 and a synchrotron 13, all of which are accommodated in compartments partitioned by concrete walls 14. The synchrotron 13 has superconductive coil apparatuses each provided with superconductive coils wound therearound and constructed as in FIG. 1a or FIG. 2. Reaction between atomic nuclei and protons establish an intranuclear cascade, whereby neutrons of high energy are emitted and the remaining atomic nuclei emit neutrons of low energy, as mentioned previously. The superconductive coil apparatuses are prevented from heat generation and being damaged by the neutrons present around the synchrotron 13.

Figure 5:
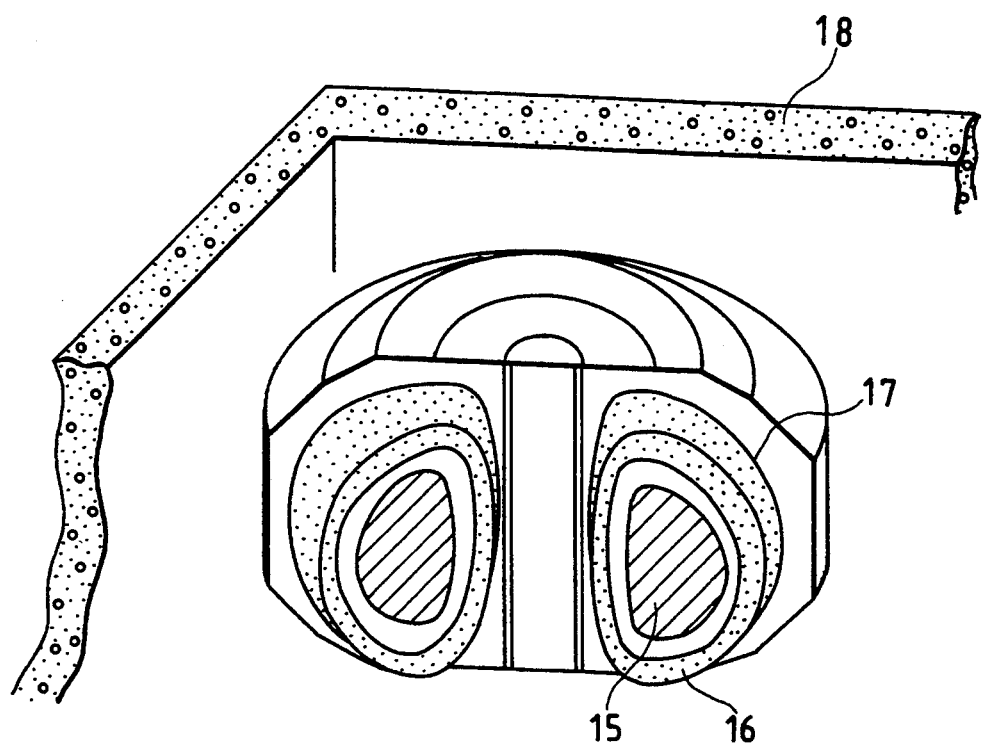
FIG. 5 is a sectional view of a nuclear fusion apparatus in which an embodiment of the invention is applied.

FIG. 5 is another example of an application of the superconductive coil apparatus according to the present invention.

In FIG. 5, a nuclear fusion apparatus is illustrated. The nuclear fusion apparatus comprises a nuclear fusion plasma 15, a blanket 16 and a superconductive coil apparatus 17, all of which are enclosed by concrete walls 18.

The superconductive coil apparatus 17 is constructed as in FIG. 1 or FIG. 2, and prevented from heat generation and being damaged by neutrons occurring therearound.

The present invention can be applied to various superconductive apparatuses used in an environment in which neutrons are present, such as superconductive motors, superconductive wires, etc. as well as the described superconductive coil apparatus and the superconductive application element.

What is claimed is:

1. A superconductive apparatus comprising;
   a superconductive member; and
   a lithium member of a lithium metal alloy selected from a group consisting of a lithium aluminum alloy and a lithium containing stainless steel, disposed so as to protect a portion of said superconductive member from undesired radiation impingement thereon, said lithium member having equivalent lithium thickness of at least 3 mm.

2. A superconductive apparatus according claim 1, wherein at least said portion of said superconductive member is surrounded by a heat insulating material so as to insulate the superconductive member from heat generated in said lithium member.

3. A superconductive apparatus according to claim 1, wherein said lithium-aluminum alloy includes Li of more than 1.5 wt %.

4. A superconductive apparatus comprising:
   a superconductive application element;
   at least a superconductive member constituting at least a portion of said superconductive application element;
   a heat insulating material surrounding the whole of the superconductive application element;
   a lithium member of a lithium metal alloy selected from a group consisting of lithium aluminum alloy and lithium containing stainless steel, said lithium member having equivalent lithium thickness of at least 3 mm and disposed outside said heat insulating material so as to protect said superconductive application element from undesired radiation impingement thereon.

5. A superconductive apparatus according to claim 3, wherein said superconductive application element is a Josephson junction element.

6. A superconductive coil apparatus comprising:
   a plurality of superconductive coils;
   a member of a lithium, metal alloy selected from a group consisting of a lithium aluminum alloy and lithium containing stainless steel, said member having equivalent lithium thickness of at least 3 mm and dispose so as to cover said portion of said plurality of superconductive coils to protect said coils from undesired radiation impingement thereon.

7. A superconductive coil apparatus according to claim 6, wherein said coils each are wound on a bobbin, and supported by a support so as to prevent the wound coils from expanding outside, said support is made of a lithium-aluminum alloy.

8. A superconductive coil apparatus according to claim 7, wherein said bobbin is made of a lithium-aluminum alloy.

9. A superconductive apparatus according to claim 4, wherein said lithium-aluminum alloy includes Li of more than 1.5 wt. %.

* * * * *